US 6,536,683 B1

United States Patent
Filicicchia et al.

(10) Patent No.: US 6,536,683 B1
(45) Date of Patent: Mar. 25, 2003

(54) SPRAY APPARATUS WITH MULTIPLE PRESSURIZABLE TANK LIQUID SUPPLY SYSTEM

(75) Inventors: Daniel J. Filicicchia, Londonderry, NH (US); Michel R. Thenin, Nashua, NH (US); Robert L. Trottier, Nashua, NH (US)

(73) Assignee: Spraying Systems Co., Wheaton, IL (US)

( * ) Notice: Subject to any disclaimer, the term of this patent is extended or adjusted under 35 U.S.C. 154(b) by 0 days.

(21) Appl. No.: 10/145,843

(22) Filed: May 14, 2002

(51) Int. Cl.[7] .............................. B05B 9/00; B05B 9/03; A01G 27/00
(52) U.S. Cl. .................. 239/124; 239/125; 239/127; 239/142; 239/143; 239/148; 239/67; 239/68; 222/318
(58) Field of Search .................. 239/124, 125, 239/127, 142, 143, 148, 67, 68; 222/318

(56) References Cited

U.S. PATENT DOCUMENTS 4,638,924 A  * 1/1987 Newsom .................. 222/1
4,904,505 A  * 2/1990 Ison et al. ................ 427/424
5,445,674 A  * 8/1995 DeMars .................... 118/669
6,067,906 A  * 5/2000 Ryan et al. ............... 101/335

* cited by examiner

Primary Examiner—Timothy L. Maust
Assistant Examiner—Anuradha Ramana
(74) Attorney, Agent, or Firm—Leydig, Voit & Mayer, Ltd.

(57) ABSTRACT

A liquid spraying system having a spray head and a recirculating liquid supply system for directing pressurized supply liquid to the spray head with a portion of the liquid being directed from the spray head as a discharging spray and a portion of the supply liquid exiting the spray head as a return liquid. The liquid supply system includes two separate selectively pressurizable liquid containable tanks each having a respective fluid conduit coupled to the spray head. The liquid supply system has (1) a first cycle of operation in which the first tank is pressurized and the second tank is depressurized so that pressurized liquid is supplied from the first tank to the spray head and return liquid is directed to the second tank, and (2) a second cycle of operation in which the second tank is pressurized and the first tank depressurized so that liquid is supplied to the spray head from the second tank and return liquid is directed to the first tank.

27 Claims, 6 Drawing Sheets

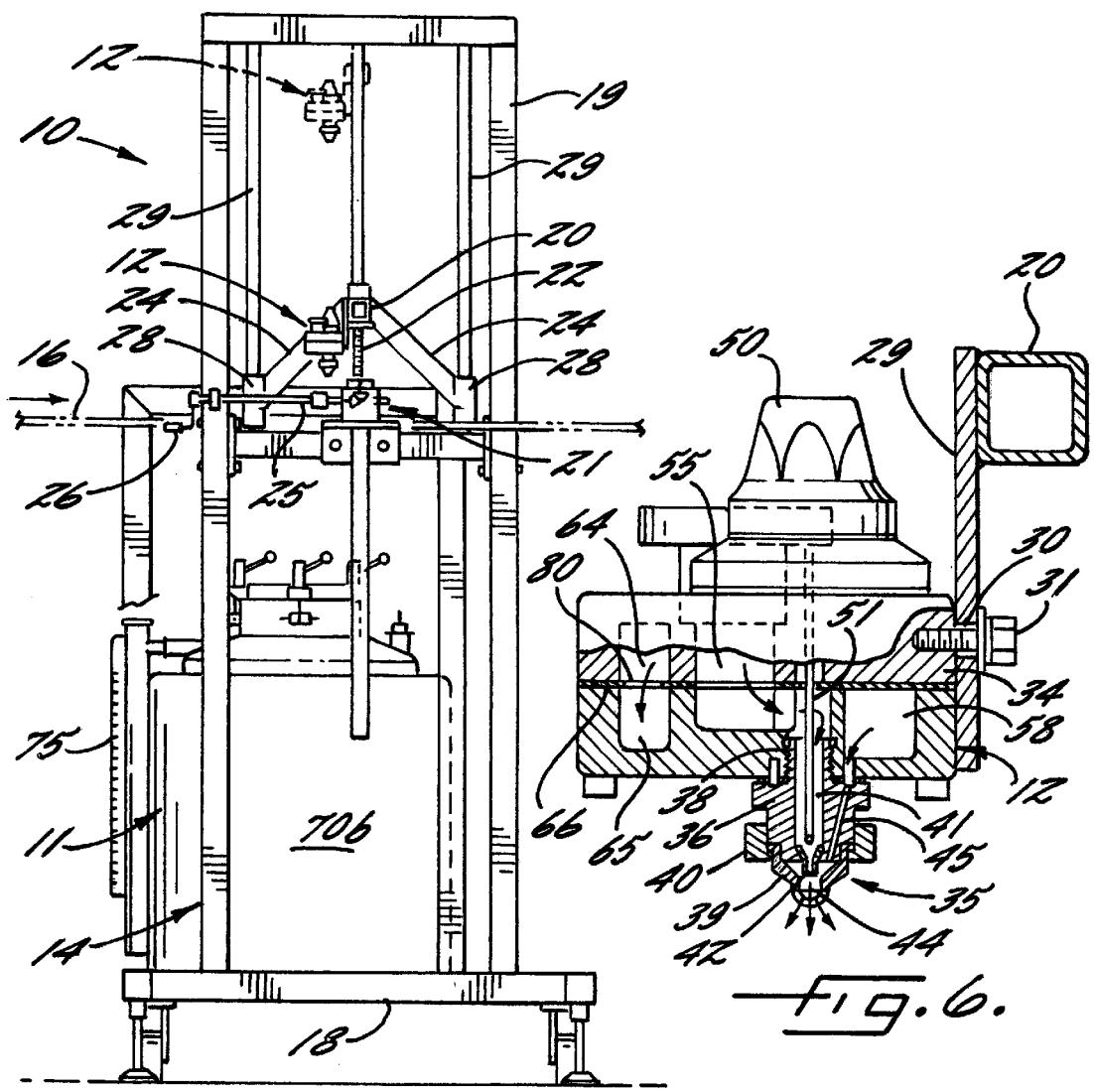
Fig. 3.
Fig. 6.
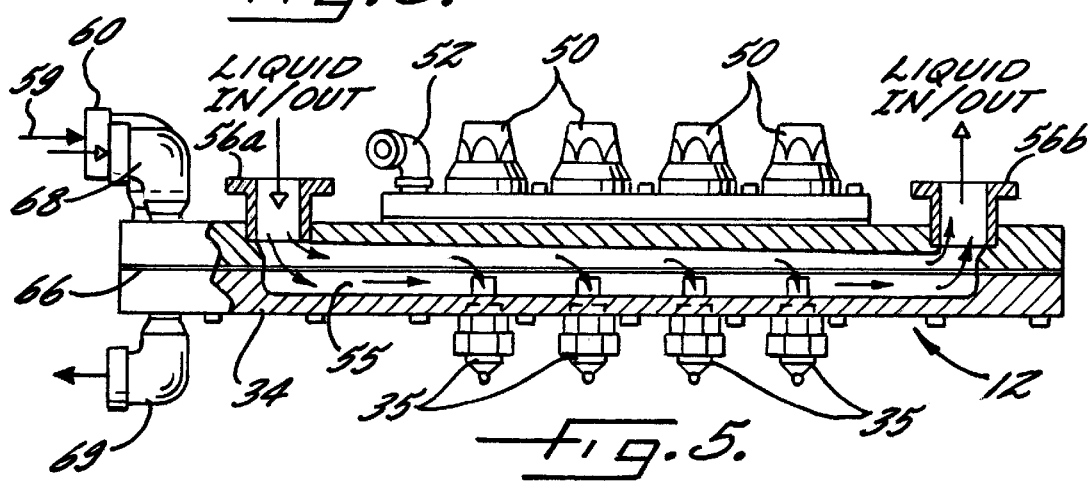
Fig. 5.

SPRAY APPARATUS WITH MULTIPLE PRESSURIZABLE TANK LIQUID SUPPLY SYSTEM

FIELD OF THE INVENTION

The present invention relates generally to spraying systems, and more particularly, to spraying systems in which the supply liquid, in part, is recirculated during the spraying operation.

BACKGROUND OF THE INVENTION

When spraying thixotropic liquids which have a tendency to crystallize or solidify, such as liquid chocolate, the supply liquid must be heated and recirculated during the spraying operation so that the liquid stays above a crystallization temperature and remains in motion at all times. If the liquid dead-ends at the nozzle or spray header, and hence ceases to circulate, clogging is likely to occur.

Typically, the supply liquid is provided in an open tank from which it is pumped to the spray nozzle or header. Excess liquid that proceeds past the spray nozzle or header is returned back to the open tank for reuse. Such system is disadvantageous because the pumps are relatively expensive and difficult to heat. It also is difficult to inexpensively control the pressurized liquid supply in such system. In some instances, the supply liquid is provided in a pressurized supply tank. Pressure in the tank directs the liquid to the spray nozzle or header, with excess liquid being returned to an open tank. In this case, the return liquid must be poured into the existing or a new pressurizable supply tank. This repeating procedure can be tedious, time consuming, and disruptive of the spraying operation.

OBJECTS AND SUMMARY OF THE INVENTION

It is an object of the present invention to provide a spraying apparatus with a liquid supply and circulation system, particularly adapted for use with thixotropic liquids, which eliminates both costly pumps and the tedious handling of return liquid from the spray nozzle or header.

Another object is to provide a spraying apparatus with a liquid supply and circulation system as characterized above which can be operated on a substantially uninterrupted basis.

A further object is to provide a spraying apparatus with a liquid supply and circulation system of the foregoing type in which the return liquid may be redirected to the spray nozzle or header without significant interruption in the spray operation.

Still another object is to provide a spraying apparatus with a liquid supply and circulation system of the above kind which includes a plurality of pressurizable liquid supply and liquid return tanks which can be alternatively and successively used for supplying pressurized liquid to the spray nozzle or header without substantial interruption in the spraying operation.

Yet a further object is to provide a novel method of supplying liquid to a spray head utilizing a multiplicity of pressurizable liquid containable tanks.

Other objects and advantages of the invention will become apparent upon reading the following detailed description and upon reference to the drawings, in which:

BRIEF DESCRIPTION OF THE DRAWINGS

FIG. 3. is an end elevational view of the illustrated spraying apparatus, taken in the plane of line 3—3 in FIG. 1;

FIG. 4 is an enlarged perspective of the spray header of the illustrated spraying apparatus;

FIG. 5 is a longitudinal, vertical section of the spray header taken in the plane of line 5—5 in FIG. 4;

FIG. 6 is an enlarged transverse vertical section of the spray header, taken in the plane of line 6—6 in FIG. 4;

Figure 1:
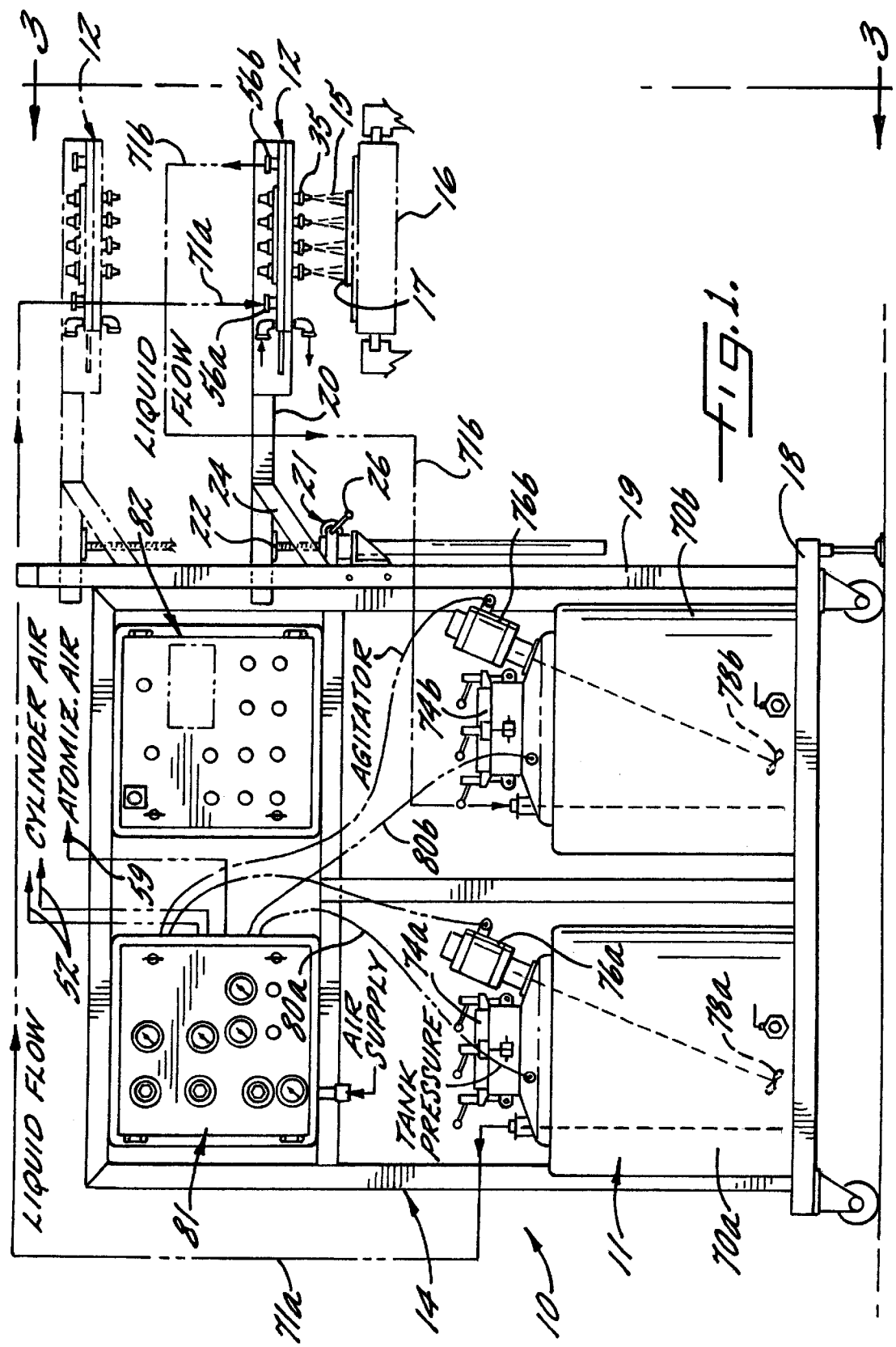
FIG. 1 is a side elevational view of a liquid spraying apparatus having a liquid supply and circulation system in accordance with the invention.
Figure 2:
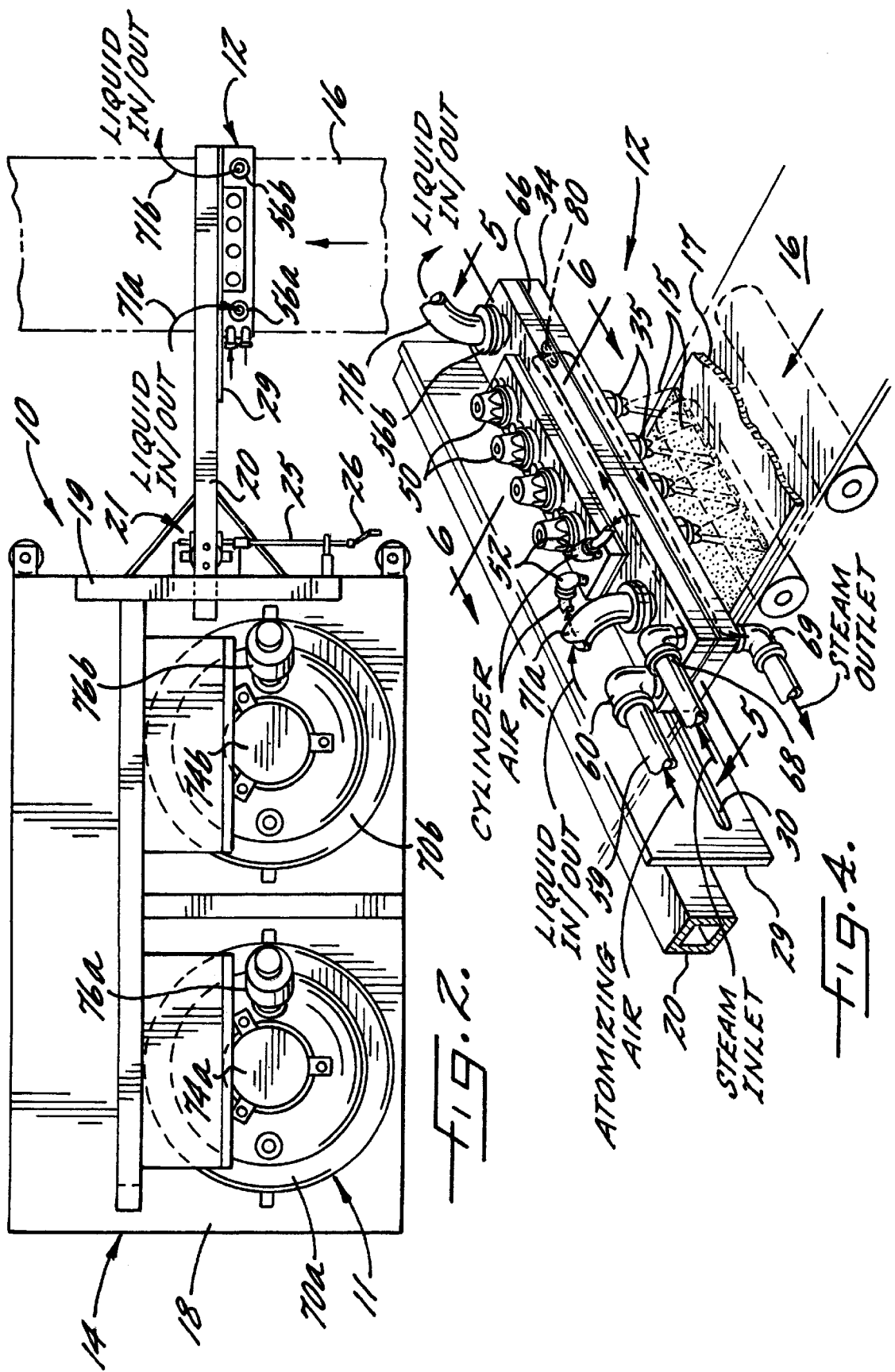
FIG. 2. is a top view of the spraying apparatus shown in FIG. 1.
Figure 7:
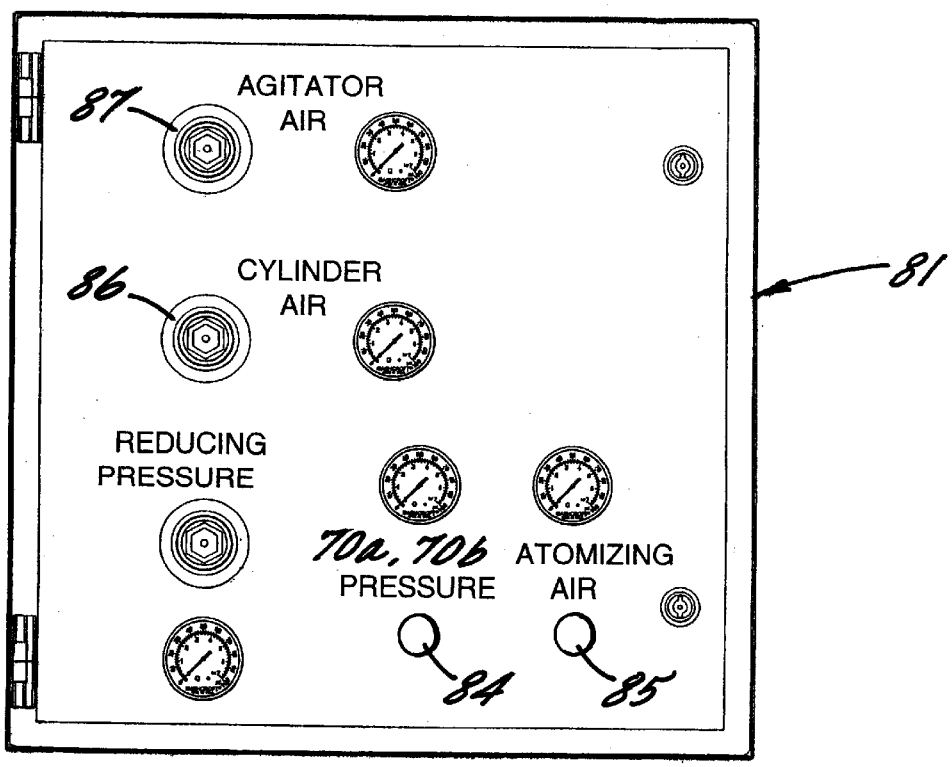
FIGS. 7 and 8 are enlarged front elevational views of control panels of the illustrated spray apparatus.
Figure 8:
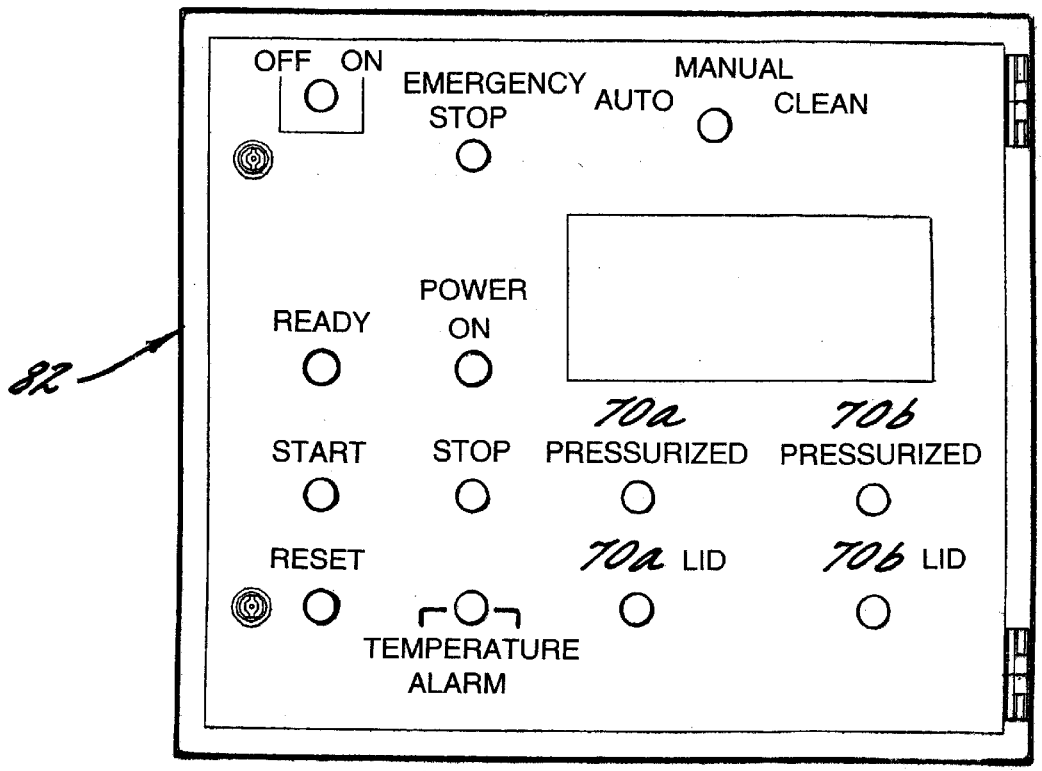

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Referring now more particularly to the drawings, there is shown an illustrative spraying apparatus 10 having a liquid supply and circulation system 11 in accordance with the invention. The spraying apparatus 10 in this instance includes a spray header 12 which is supported on a movable skid or platform 14 and adapted for directing a transverse curtain of liquid spray 15, such as a heated liquid chocolate, for coating a substrate 17 supported on a conveyor belt 16 moving under the spray header 12. As will become apparent to one skilled in the art, the spray apparatus 10 may be used to spray various liquid substances, including foods, pharmaceuticals, chemicals, or like substances, in different processing environments. The skid 14 in this case has a wheeled base 18 with an upstanding vertical support structure 19 which carries a horizontal spray header support arm 20 for selected vertical positioning.

For permitting adjustable vertical positioning of the header support arm 20, and hence the spray header 12 mounted thereon, a screw jack 21 is mounted in lateral spaced relation to the support structure 19. The screw jack 21 includes a screw 22 that is rotatably supported by the support structure 21 and a support bracket 24 (FIG. 1) to which the support arm 20 is fixedly mounted for vertical movement in response to rotation of the screw 22. For rotating the screw 22, a right angle worm gear screw 25 is provided, which is rotatable by a hand crank 26 located at a side of the apparatus 10. For guiding vertical movement of the arm supporting bracket 24, the bracket 24 includes a pair of mounting bearings 28 that move on guide rods 29 carried by the support structure 19 in parallel relation to and on opposite sides of the screw 22. Hence, by rotation of the hand crank 26, the screw jack bracket 24, support arm 20, and spray header 12 are selectively adjustable vertically relative to the conveyor belt 16.

For permitting limited horizontal adjustment in position of the spray header 12 on the support arm 20, the spray header 12 is supported on the mounting arm 20 by means of a vertical plate 29 (FIGS. 4 and 6) having a horizontal slot 30. The spray header 12 is secured to the vertical plate 29 by mounting screws 31, which upon loosening, enable limited horizontal adjustment of the spray header 12 along the plate slots 30 for precise positioning with respect to the conveyor.

The illustrated spray header 12 is of the type disclosed in U.S. application Ser. No. 10/054,280, assigned to the same assignee as the present application, the disclosure of which is incorporated herein by reference. The spray header 12 includes a header block 34 that supports a row of laterally spaced spray nozzles 35 for directing a transverse curtain of liquid spray. Each of the illustrated spray nozzles 35, as best depicted in FIG. 6, comprises a nozzle body 36 having an upstream stem 38 threaded into an underside of the header block 34 and an air cap 39 secured on a discharge end of the nozzle body 36 by a retaining nut 40. The nozzle body 36 is formed with a central liquid passage 41 for directing a supply liquid through a tip insert 42 mounted in a downstream end of the liquid passage 41 in coaxial aligned relation to a spray discharge orifice 44 in the air cap 39. The nozzle body 36 further has one or more side passages 45 for communicating pressurized air to an annular air chamber defined between the cap 39 and nozzle body 36 in surrounding relation to the tip insert 42 for intermixing pressurized air with liquid directed through the liquid passage 41 and tip insert 42 for preatomizing and discharging of the liquid spray from the nozzle cap discharge orifice 44.

For controlling the discharge of liquid spray from the nozzles, each nozzle 35 has a respective actuator or air cylinder 50 mounted on an opposite upper side of the header block 34 with an elongated valve needle 51 thereof being spring biased downwardly toward a valve closing position. The valve needle 51 is movable axially in the opposite direction (upwardly in FIG. 1) against the spring biasing force by pressurized air or other fluid supplied to the actuator 50. It will be appreciated, therefore, that the valve needles 51 of each of the spray nozzles 35 supported by the header 12 may be operated between on and off positions through selected supply of pressurized fluid to the respective actuator. For this purpose, the spray header 12 has pressurized air inlet lines 52 which communicate air through the header block 34 to the actuators or cylinders 50 as described in the afore-referenced patent application.

For directing a supply liquid to the nozzles 35, the header body 34 is formed with a liquid supply passage 55, which communicates with each of the spray nozzles 35 and extends longitudinally through the header between inlet/outlet fittings 56a, 56b at opposite ends thereof. For directing atomizing air to the nozzle body air passages 45, the header 12 also defines an atomizing air passage 58 which communicates pressurized atomizing air from a supply line 59 and inlet elbows 60 with the side passages 45 of the nozzle bodies 36.

In order to maintain the supply liquid at a predetermined temperature for efficient spraying, the header block 34 defines juxtaposed passages 64, 65 (FIG. 6), which are separated along their length by an interposed gasket 66, through which a heating fluid is directed. An inlet elbow 68 (FIGS. 4 and 5) connected to a heating fluid (such as steam or hot water) supply line is mounted on the top of an end header block 34 in fluid communication with the upper passage 64. An outlet elbow 69 connected to a steam outlet and recirculating line is mounted on an underside of the same end of the header block 34 in communication with the lower passage 65. Steam directed into the inlet elbow 68 proceeds along the upper passage 64 substantially the length of the header block 34 then communicates through an aperture 80 in the gasket 66 (FIG. 4) communicating between the passages 64, 65 for return through the lower passage 65 to the outlet elbow 69.

In accordance with the invention, the spraying apparatus has a liquid supply and circulation system that includes a plurality of selectively pressurizable supply liquid tanks which each have a respective fluid conduit coupled to the spray head and which are successively operable for directing pressurized supply liquid to the spray head from the plurality of tanks without disconnecting the fluid conduits of the tanks from the spray head. More particularly, the liquid supply and circulation system of the invention includes first and second liquid supply tanks, and the liquid supply system has (1) a first cycle of operation in which the first tank is pressurized and the second tank is depressurized so that pressurized liquid is supplied from the first tank to the spray head and return liquid from the spray head is directed to the second tank and (2) a second cycle of operation in which the second tank is pressurized and the first tank is depressurized so that pressurized liquid is supplied to the spray head from the second tank and return liquid is directed to the first tank. To this end, the illustrated liquid supply and circulation system 11 includes a first pressurizable tank 70a having a first fluid conduit 71a, which preferably is heated, coupled to one of the inlet/outlet fitting 56a on the spray header 12, and a second pressurizable tank 70b having a second fluid conduit 71b, also preferably heated, connected to the other inlet/outlet fitting 56b at the opposite end of the spray header 12. Each tank 70a, 70b has a respective removable and/or replaceable cover 74a, 74b to enable filling of the tank with a supply liquid to be sprayed. The tanks 70a, 70b in this case each have a vertical sight tube 75 (FIG. 3) which provides a visual indication of the liquid level within the tank. In order to agitate the liquid contained within the tanks so that it remains in motion at all times, each tank 70a, 70b has a respective agitator 76a, 76b having an agitator blade 78a, 78b rotatably driven by a fluid air operated motor. Fluid air pressure to the agitator motors can be adjusted by a pressure regulator 87 on a valve enclosure 81.

For enabling selective pressurization of the tanks 70a, 70b, each tank has a respective pressurized air inlet line 80a, 80b with a respective control valve, which in this case is contained within the valve enclosure 81 and operated from a controller 82. Each tank 70a, 70b thereby may be selectively pressurized or depressurized. It will be understood that upon pressurization of a selected one of the tanks 70a, 70b and depressurization of the other tank, a pressurized liquid flow stream will be directed to the spray header 12 via the conduit of the selected pressurized tank. Pressure within the selected pressurized tank preferably can be adjusted by an appropriate pressure regulator 84 on the valve enclosure 81. Manual control of the atomizing air to the spray nozzles 35 and cylinder air to the valve actuators 50 also preferably can be manually adjusted by pressure regulators 85, 86 on the valve enclosure 81.

In carrying out the invention, the liquid supply and circulation system includes an electronic control system that monitors fluid levels in the tanks and controls liquid direction and circulation through the spraying system in response thereto. In the illustrated embodiment, each of the tanks 70a, 70b has a liquid level sensor 88a, 88b for indicating when the liquid within the tank is lowered to a predetermined low level. Based upon the sensor indications, the controller will not initiate direction of liquid from a selected tank to the spray header unless the presence of a liquid above the predetermined level exists in the tank. Likewise, the supply of liquid will be interrupted in response to the sensor indicating that the liquid has been lowered to the predetermined low level.

Figure 9A:
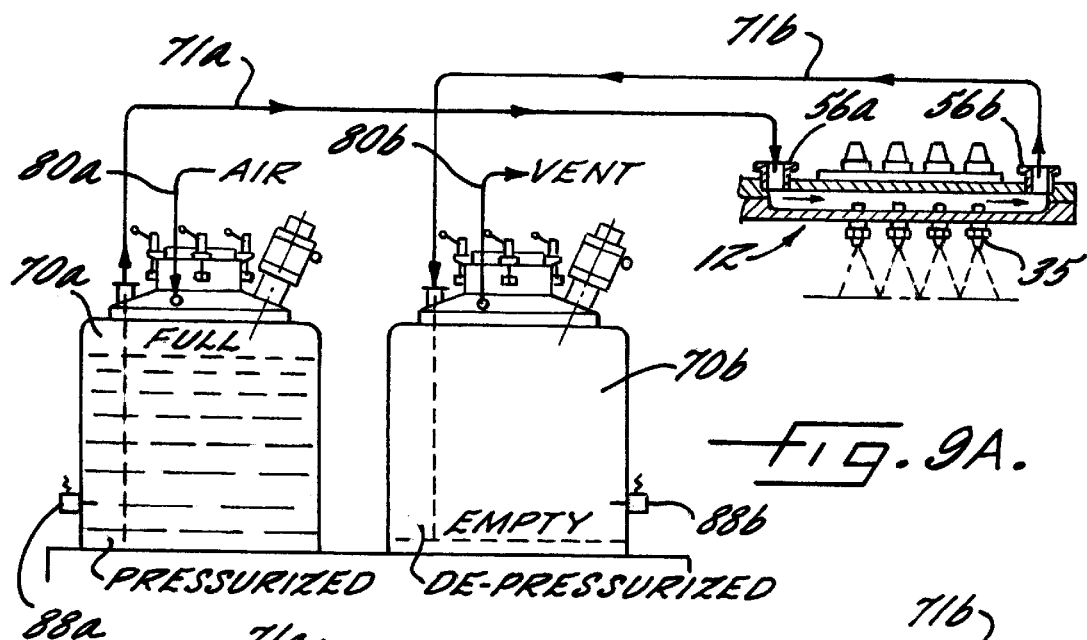
FIGS. 9A–9C are partially diagrammatic, sequential depictions of the operation of the illustrated liquid supply and circulation system.
Figure 9B:
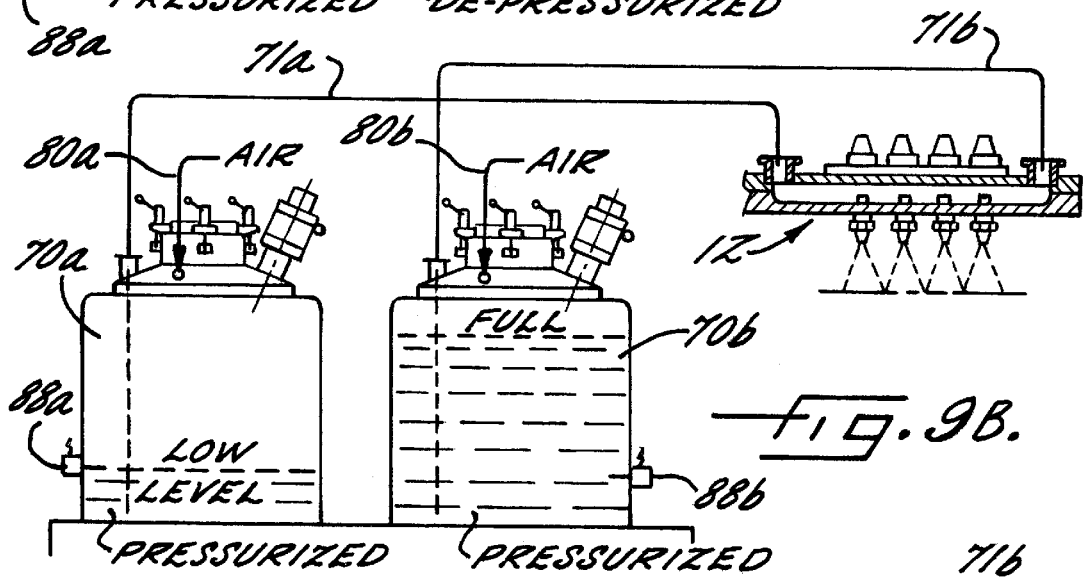
Figure 9C:
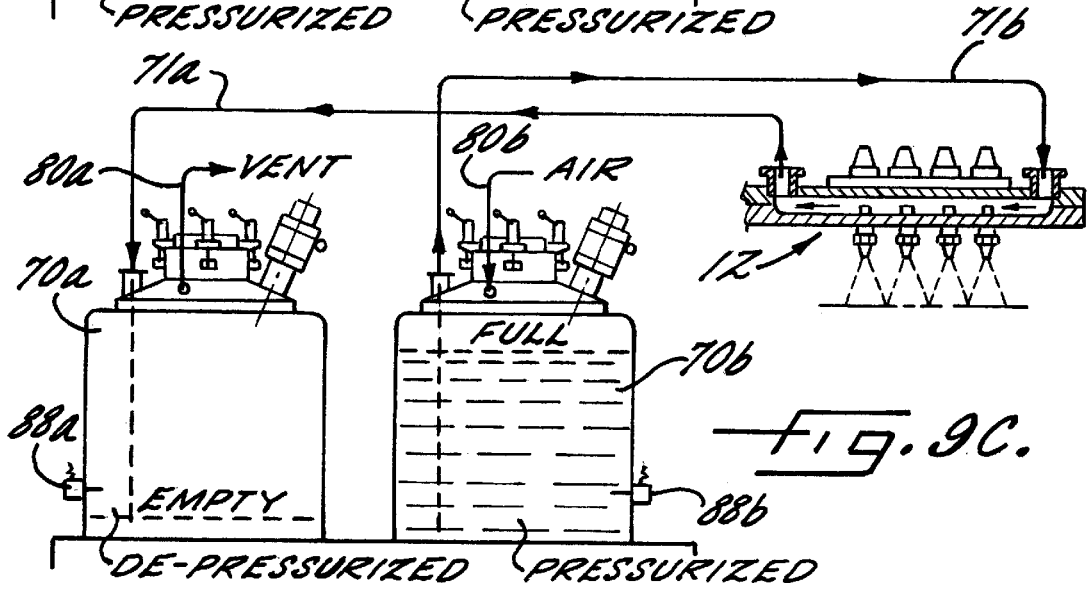

A typical operation of the liquid circulation and supply system 11 is depicted in FIGS. 9A–9C. To initiate the supply of liquid from the tank 70a to the spray header 12, the controller 82 will first verify, via the sensor 88a, that supply liquid is contained in the first tank 70a above the minimum low level. If that is verified to be the case, the first tank 70a is pressurized through the direction of pressurized air to the tank through the inlet line 80a, and the second tank 70b is depressurized causing supply liquid to be directed through the first conduit 71a to the spray header 12 where at least a portion of the supply liquid is directed through the plurality of nozzles 35 as a discharging spray and the remaining liquid which passes through the spray header 12 without being sprayed (i.e. the return liquid) is directed through the second line 71b to the depressurized second tank 70b, as depicted in FIG. 9A. This operation continues until the liquid level in the first tank 70a reaches the predetermined low level, as indicated by the sensor 88a.

Upon the sensor 88a indicating the low liquid level in the first tank 70a and the controller determining via the sensor 88b the presence of supply liquid in the second tank 70b above the predetermined low level, the controller 82 will initiate pressurization of the second tank 70b through the direction of pressurized air through the inlet line 80b as depicted in FIG. 9B, and within a predetermined relatively short period thereafter, the first tank 70a is depressurized (as depicted in FIG. 9C). The second tank 70b then causes material to flow from the second tank 70b through the second line 71b to the spray header 12, which directs at least a portion of the liquid through the spray nozzles 35 with the remainder of the liquid which is not sprayed (i.e. return liquid) being returned through the first conduit 71a to the depressurized first tank 70a. This operation continues until the liquid in the second tank 70b reaches the predetermined low level as determined by the sensor 88b, which then again triggers reversal of the supply tank from which liquid is directed to the spray header 12. This repeating process continues until the liquid level sensors 88a, 88b on both tanks 70a, 70b indicate a low liquid level, at which time the controller activates an alarm to indicate the need to refill one of the tanks.

Figure 10:
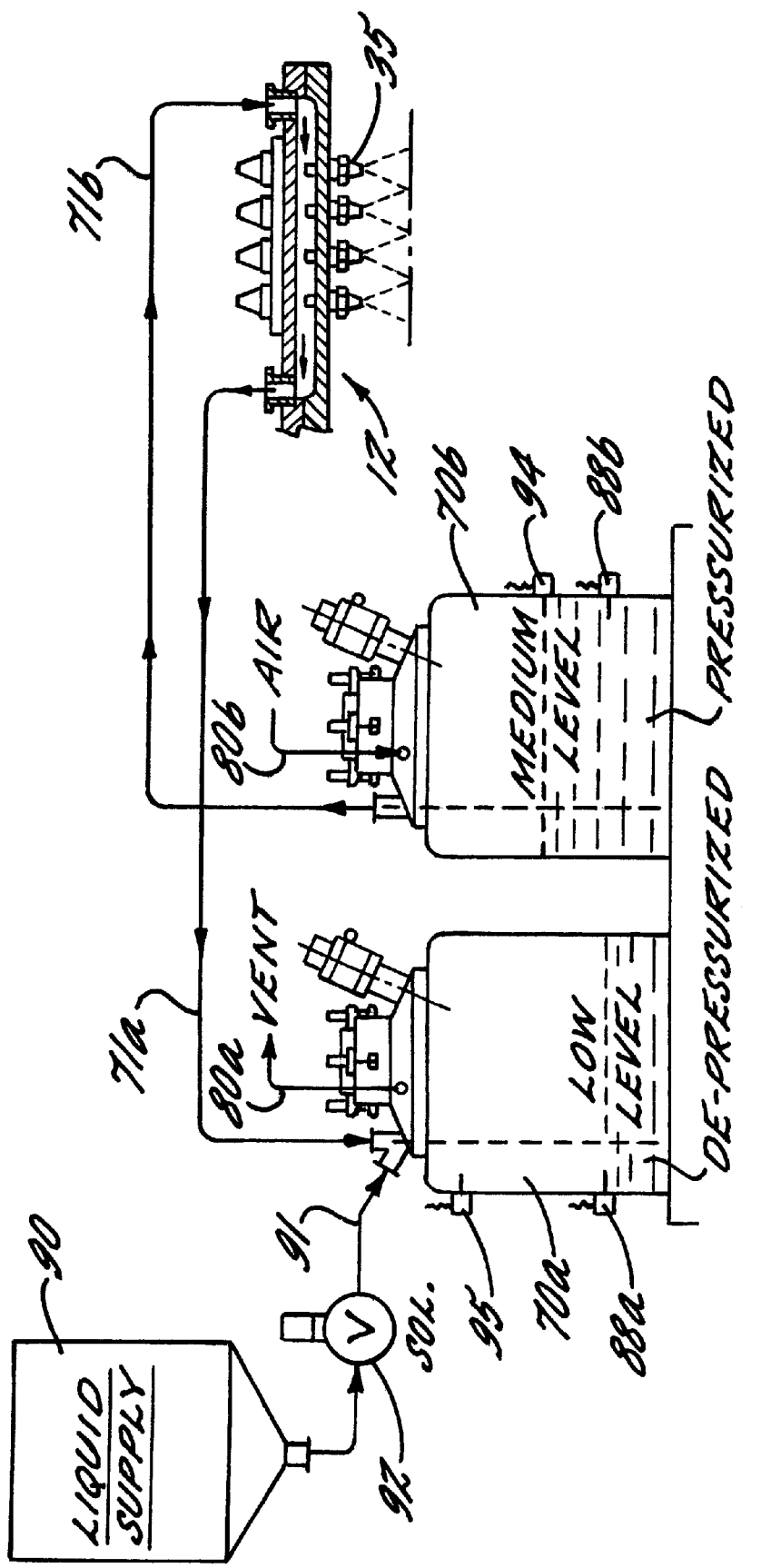
FIG. 10 is a partially diagrammatic illustration of an alternative embodiment of liquid supply and circulation system in accordance with the present invention.

Referring now to FIG. 10, there is shown an alternative embodiment of the invention adapted for automatic refilling of the tanks and continued uninterrupted spraying. Items similar to those described above have been given similar reference numerals. In this embodiment, an auxiliary liquid supply container 90 is provided, which has a supply line 91 connected to the first tank 70a through a solenoid control valve 92. The second tank 70b is provided with a medium liquid level sensor 94 for indicating a medium level of liquid in the tank. The controller 82 is programmed so that when the liquid level in the first tank 70a is at the low level and the liquid level in the second tank 70b is lowered to the medium level, the first tank 70a is depressurized and the solenoid valve 92 opened to enable automatic filling of the first tank 70a to a predetermined high level, as sensed by a high liquid level sensor 95, at which time the control valve 92 is closed. It will be appreciated by one skilled in the art that such refilling can take place when the first tank 70a is in a depressurized state and the system is in operation directing liquid to the spray header 12 from the second tank 70b.

From the foregoing, it can be seen that the liquid supply and circulation system of the present invention, which is particularly adapted for use with tyxotropic liquids, eliminates the need for costly pumps and the tedious handling of return liquid from the spray nozzle or header. The liquid supply system further can be operated on a substantially uninterrupted basis and is adapted to permit efficient refilling of the liquid supply tanks.

What is claimed is:

1. A liquid spraying system comprising a spray head having at least one spray nozzle for discharging a liquid spray, a liquid supply system for directing pressurized supply liquid to the spray head with a portion of the supply liquid being directed from said spray head as a discharging spray and a portion of the supply liquid exiting the spray head as a return liquid, said liquid supply system including first and second selectively pressurizable liquid containable tanks, said first tank having a first fluid conduit coupled to said spray head, said second tank having a second fluid conduit coupled to said spray head, said liquid supply system having a first cycle of operation in which said first tank is pressurized and said second tank is depressurized so that pressurized liquid is supplied from said first tank to said spray head and return liquid is directed through said second conduit to said second tank, and said liquid supply system having a second cycle of operation in which said second tank is pressurized and said first tank is depressurized so that pressurized liquid is supplied to said spray head from said second tank through said second conduit and return liquid is directed through said first conduit to said first tank.

2. The liquid spray system of claim 1 in which said first and second tanks each have a respective liquid level sensor, and a control responsive to the liquid level sensor of the first tank sensing a predetermined low level of liquid in the tank for initiating the second liquid supply cycle.

3. The spraying system of claim 2 in which said control is operable upon the sensor of said first tank sensing a low liquid level in said first tank for pressurizing said second tank and within a predetermined period thereafter depressurizing said first tank.

4. The liquid spraying system of claim 2 in which said control is responsive to the liquid level sensor of said second tank sensing a predetermined low level of liquid in the second tank for initiating the first liquid supply cycle.

5. The spraying system of claim 4 in which said control is responsive to the sensors of said first and second tanks both sensing a predetermined low liquid level in said first and second tanks for providing a refill indication.

6. The spraying system of claim 4 in which said second tank includes a second sensor for sensing a medium liquid level in said second tank greater than the low liquid level, and said control being operable in response to the sensor of the first tank sensing a predetermined low liquid level in said first tank and said second sensor sensing a medium liquid level in said second tank for providing a refill indication.

7. The spraying system of claim 4 including an auxiliary liquid supply tank containing a supply of liquid, said auxiliary tank having a supply line connected to said first tank and a selectively operable control valve for permitting communication of liquid from said auxiliary tank through said supply line to said first tank, said second tank having a second sensor for indicating a second liquid level above said low liquid level, and said control being operable in response to the sensor of said first tank sensing a low liquid level in said first tank and said sensor of the second tank sensing said second liquid level in said second tank for operating said control valve and permitting the supply of liquid from said auxiliary tank to said first tank.

8. The spraying system of claim 7 in which said control is operable for causing a predetermined amount of said liquid to be directed from said auxiliary tank to said first tank.

9. The spraying system of claim 7 in which said first tank includes a second sensor for sensing a predetermined high liquid level, and said control is operable responsive to said second sensor of said first tank sensing said high liquid level for interrupting the supply of liquid to said first tank from said auxiliary tank.

10. The spraying system of claim 4 in which said control is operable upon the sensor of said first tank sensing a low liquid level in said first tank and the sensor of said second tank sensing a liquid level above the low level in said second tank for pressurizing said second tank and depressurizing said first tank.

11. The liquid spraying system of claim 1 in which said spray head has a plurality of spray nozzles arranged in a row, and said first conduit is coupled to said spray head at one end of said row and said second conduit is coupled to said spray head at an opposite end of said row.

12. A liquid spraying system comprising a spray head having at least one spray nozzle for discharging a liquid spray, a liquid supply system for directing pressurized supply liquid to the spray head with a portion of the supply liquid being directed from said spray head as a discharging spray and a portion of the supply liquid exiting the spray head as a return liquid, said liquid supply system including a plurality of selectively pressurizable liquid containable tanks, said tanks each having a respective fluid conduit coupled to said spray head, and said liquid supply system being operable for successively directing pressurized liquid to said spray head from said plurality of tanks without disconnecting the fluid conduits of said tanks from said spray head.

13. The liquid spraying systems of claim 12 in which said liquid supply system is selectively operable for directing pressurized liquid from one of said tanks through the fluid conduit of said one tank to said spray nozzle while said one tank is pressurized and for directing return liquid through the fluid conduit of an other of said tanks while said other of said tanks is depressurized, and said liquid supply system being successively operable for directing pressurized liquid from said other of said tanks through the fluid conduit thereof to said spray head while said other of said tanks is pressurized and for directing return liquid to said one of said tanks through the fluid conduit thereof while said one of said tanks is depressurized.

14. The liquid spray system of claim 13 in which said tanks each have a respective liquid level sensor, and a control responsive to the liquid level sensor of the said one tank sensing a predetermined low level of liquid in the tank and for pressurizing the other tank and depressurizing the one tank.

15. The spraying system of claim 14 including an auxiliary liquid supply tank containing a supply of liquid, said auxiliary tank having a supply line connected to said one tank and a selectively operable control valve for permitting communication of liquid from said auxiliary tank through said supply line to said one tank, said other tank having a second sensor for indicating a second liquid level above a low liquid level, and said control being operable in response to the sensor of said one tank sensing a low liquid level in said one tank and said sensor of the other tank sensing said second liquid level in said other tank for operating said control valve and permitting the supply of liquid from said auxiliary tank to said first tank.

16. The liquid spraying system of claim 14 in which said spray head has a plurality of spray nozzles arranged in a row, and said first conduit is coupled to said spray head at one end of said row and said second conduit is coupled to said spray head at an opposite end of said row.

17. A method of supplying liquid to a spray head having at least one spray nozzle comprising the steps of providing first and second pressurizable liquid containable tanks, filling the first tank with supply liquid to a level above a predetermined low level, pressurizing said first tank and depressurizing said second tank so that pressurized liquid is supplied from said first tank to said spray head with a portion of the supply liquid being directed from said spray head nozzle as a discharging spray and a portion of said supply liquid exiting said spray head as a return liquid, and directing said return liquid to said second tank while said second tank is depressurized.

18. The method of claim 17 including steps of pressurizing said second tank and depressurizing said first tank so that a pressurized liquid is supplied to said spray head from said second tank with a portion of the supply liquid being directed from said spray head as a discharging spray and a portion of the supply liquid exiting the spray head as a return liquid, and directing the return liquid to said first tank while said first tank is depressurized.

19. The method of claim 17 including sensing when the liquid level in said first tank reaches a predetermined low level and in response thereto pressurizing said second tank and depressurizing said first tank.

20. The method of claim 19 including sensing when the liquid level in said second tank reaches a predetermined lower level and in response thereto pressurizing said first tank and depressurizing said second tank.

21. The method of claim 20 including sensing when the liquid level in said first and second tanks both reach a predetermined low level and in response thereto providing a refill indication.

22. The method of claim 20 including sensing when the liquid level in said first tank is lowered to a predetermined lower level and when liquid in said second tank is at a level above said low level, and providing a refill indication.

23. The method of claim 20 including sensing when the liquid level in said first tank is at a predetermined low level and when liquid in said second tank is at a level above said low level and in response thereto automatically directing refill liquid into said first tank.

24. The method of claim 23 including sensing when the refill liquid directed into said first tank reaches a predetermined high level, and in response thereto, automatically terminating the supply of said refill liquid.

25. A method of supplying liquid to a spray head having at least one spray nozzle comprising the steps of providing a first pressurizable liquid containable tank having a first conduit coupled to said spray head, providing a second pressurizable liquid containable tank having a second conduit coupled to said spray head, filling said first tank with supply liquid to a level above a predetermined low level, pressurizing said first tank and depressurizing the second tank so that pressurized liquid is supplied from said first tank through said first conduit to said spray head with a portion of the supply liquid being directed from said spray head nozzle as a discharging spray and a portion of said supply liquid exiting said spray head as a return liquid, and directing said return liquid through said second conduit to said second tank while said second tank is depressurized.

26. The method of claim 25 including steps of pressurizing said second tank and depressurizing said first tank so that a pressurized liquid is supplied to said spray head from said second tank through said second conduit with a portion of the supply liquid being directed from said spray head as a discharging spray and a portion of the supply liquid exiting the spray head as a return liquid, and directing the return liquid to said first tank through said first conduit while said first tank is depressurized.

27. The method of claim 25 including sensing when the liquid level in said first tank reaches a predetermined low level and in response thereto pressurizing said second tank and depressurizing said first tank, and sensing when the liquid level in said second tank reaches a predetermined lower level and in response thereto pressurizing said first tank and depressurizing said second tank.

* * * * *